US006987970B2

(12) United States Patent
Okazaki et al.

(10) Patent No.: US 6,987,970 B2
(45) Date of Patent: *Jan. 17, 2006

(54) METHOD OF CONTROLLING A COMMUNICATION TERMINAL HAVING A PLURALITY OF FUNCTIONS, COMMUNICATION TERMINAL APPARATUS, COMMUNICATION CONTROL SYSTEM

(75) Inventors: Shinji Okazaki, Kanagawa (JP);
Hirokazu Takagaki, Kanagawa (JP);
Katsumi Hirota, Kanagawa (JP);
Koichi Matsuno, Kanagawa (JP);
Ichiro Hino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/093,329

(22) Filed: Mar. 29, 2005

(65) Prior Publication Data

US 2005/0170821 A1   Aug. 4, 2005

Related U.S. Application Data

(63) Continuation of application No. 09/784,552, filed on Feb. 16, 2001, now Pat. No. 6,889,043.

(30) Foreign Application Priority Data

Feb. 21, 2000   (JP)   ............................ P2000-043215
May 17, 2000   (JP)   ............................ P2000-145387

(51) Int. Cl.
  *H04Q 7/20*   (2006.01)
  *H04Q 7/32*   (2006.01)
(52) U.S. Cl. .............................. 455/435.1; 455/435.2; 455/435.3; 455/550.1; 455/414.3; 455/403; 455/422.1; 455/404.1; 379/433.01; 379/428.01; 379/430

(58) Field of Classification Search ............. 455/404.1, 455/404.2, 403, 435.1, 435.2, 432.1, 432.3, 455/422.1, 517, 69, 550.1, 563, 500, 412.1, 455/412.2, 414.1, 414.2, 414.3, 426.1, 426.2, 455/432.2, 433, 556.1, 557, 569.1, 575.1, 455/575.2, 90.1, 90.3, 410, 411; 379/433.01, 379/428.01, 430

See application file for complete search history.

(56) References Cited

U.S. PATENT DOCUMENTS

| 5,732,125 A | * | 3/1998 | Oyama | ..................... 455/404.1 |
| 6,058,311 A | * | 5/2000 | Tsukagoshi | .............. 455/435.1 |
| 6,181,940 B1 | * | 1/2001 | Rune | ....................... 455/435.2 |
| 6,285,867 B1 | * | 9/2001 | Boling et al. | ............ 455/404.1 |

* cited by examiner

*Primary Examiner*—Keith T. Ferguson
(74) *Attorney, Agent, or Firm*—Jay H. Maioli

(57) ABSTRACT

When a radio communication is made between a predetermined base station and a communication terminal, the communication terminal is allowed to make a communication if a predetermined registration processing is made. If the above registration processing is not executed, then predetermined functions other than a communication function of the communication terminal are limited. Moreover, when a predetermined operation mode is set by an operation means, at least a transmission processing at a radio communication means is stopped and an execution of predetermined functions other than the radio communication processing is not restricted. Thus, when a communication terminal apparatus incorporates therein other functions than an audio reproducing function, operation of such function can be limited properly. Moreover, when other functions such as an audio reproducing function are incorporated into a communication terminal apparatus, operations of the functions thus incorporated can be limited properly and the communication functions can be stopped properly.

1 Claim, 11 Drawing Sheets

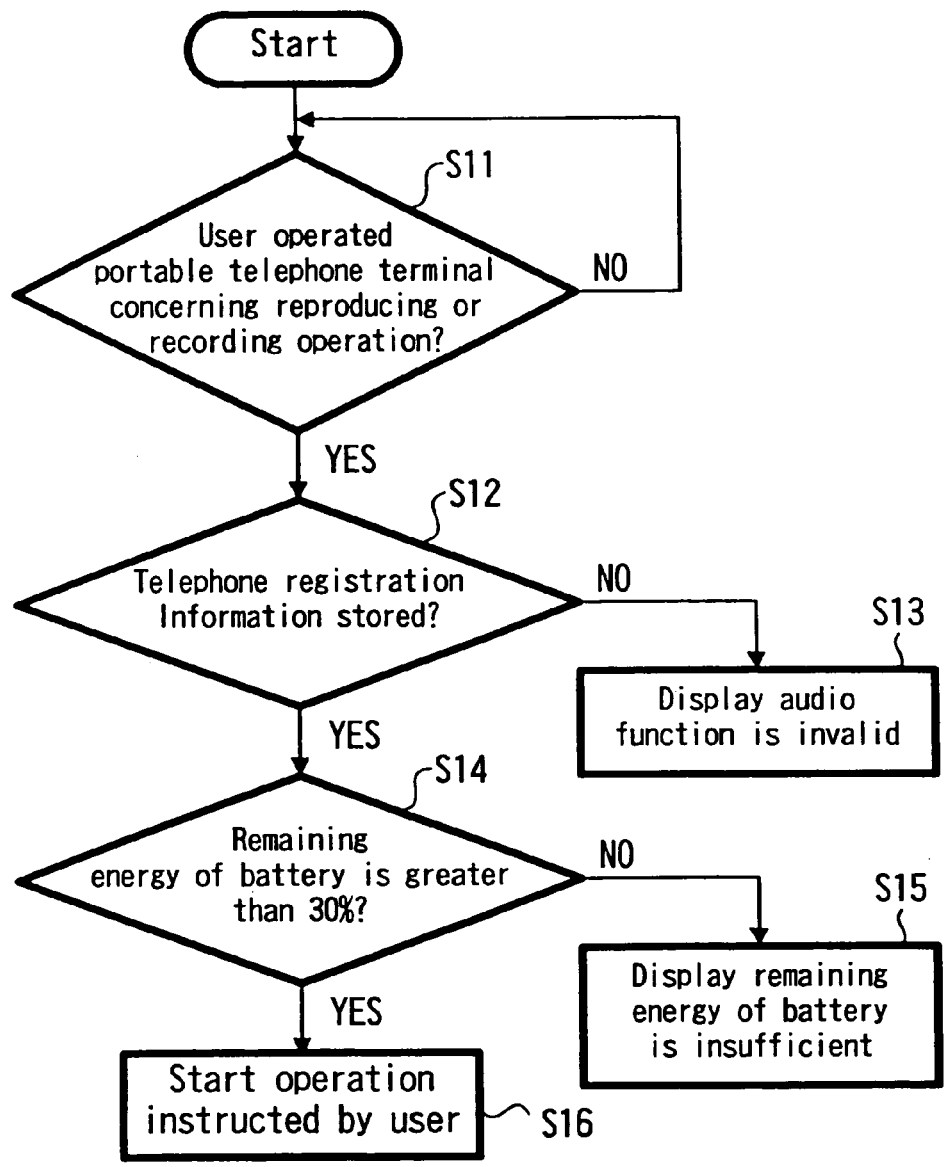

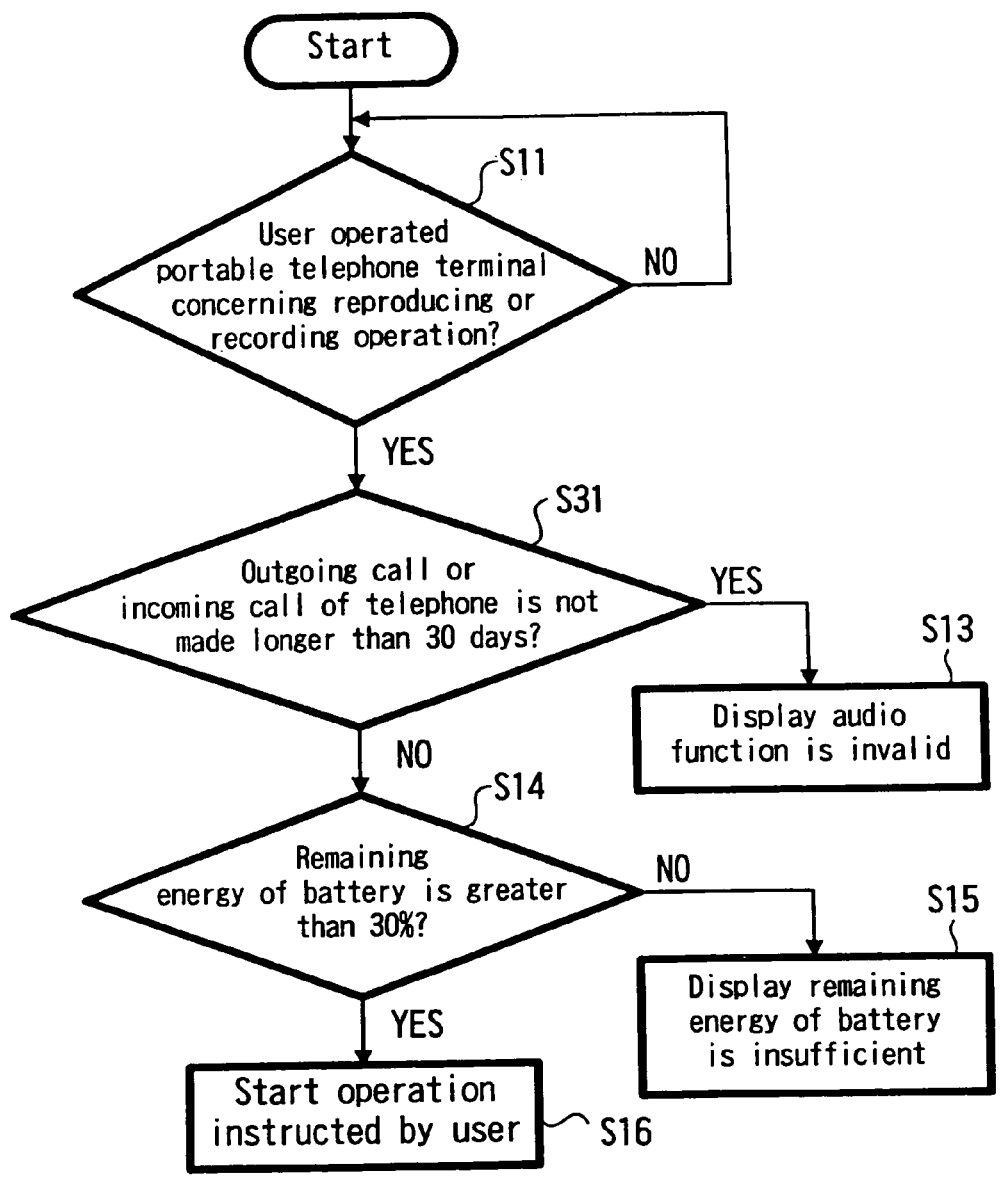

METHOD OF CONTROLLING A COMMUNICATION TERMINAL HAVING A PLURALITY OF FUNCTIONS, COMMUNICATION TERMINAL APPARATUS, COMMUNICATION CONTROL SYSTEM

This is a continuation of prior application Ser. No. 09/784,552 filed Feb. 16, 2001 now U.S. Pat. No. 6,889,043.

BACKGROUND OF THE INVENTION

1. Field of the Invention

The present invention relates to a method of controlling a communication terminal and a communication terminal apparatus for use with a radio telephone apparatus called a portable telephone terminal and a communication system using such communication terminal apparatus, for example. More specifically, this invention relates to a method of controlling the execution of the functions in a communication terminal having one or more functions different from a communication function, a communication terminal apparatus and a communication system using such communication terminal.

2. Description of the Related Art

Heretofore, there have been proposed various combined terminals which are communication terminal apparatus for use as radio telephone apparatus having other functions different from a telephone function combined therewith. Since radio telephone apparatus are generally designed to be compact in size so that users can usually carry them when in use, there are radio telephone apparatus having a radio telephone function and extra functions such as a clock function and a schedule managing function to display necessary information such as time information and schedule information on a display device of a terminal apparatus.

As a storage capacity of a semiconductor memory is increasing and an audio data compression technology is improving in recent years, a memory incorporated within a memory card becomes able to store audio data of approximately several 10s of minutes to several hours, for example. Small reproducing apparatus having this memory card as a recording medium (storage medium) and a headphone are now commercially available as audio players capable of reproducing audio data or sounds so that users can listen to reproduced audio data or sounds through the headphone.

There is proposed a highly-capable combined terminal having an audio reproducing apparatus incorporated within a portable terminal apparatus. Because the portable telephone terminal incorporates the audio reproducing apparatus using the above memory as the recording medium, when the portable telephone terminal is not in use as a telephone for making a telephone conversation, a user can listen to audio data or sounds reproduced through the headphone attached to the portable telephone terminal. With this arrangement, services of portable telephone terminals can be expanded.

The above portable telephone terminal can download audio data on the memory card attached thereon from a center through a radio telephone network line, for example, and can store the audio data thus downloaded in the memory card. Therefore, users can get audio data with ease, which is very convenient for users.

A distribution service for distributing audio data to the above portable telephone terminal incorporating the audio reproducing apparatus may be a pay distribution service. Since it has been customary that such pay distribution service is under control of a telephone company for operating a radio telephone system, the telephone company may collect charges for the pay distribution services from users. Even when the audio data distribution service is free, the telephone company usually serves the free audio distribution to the users of the portable telephone terminals as one of additional services. Therefore, with respect to the above free audio distribution service, it is desirable that only those who had contracted with the telephone company should be served.

Further, since the audio reproducing apparatus of the portable telephone terminal is essentially the portable telephone terminal, the telephone company may charge for the audio data distribution service each time a user reproduces audio data by the portable telephone terminal. Specifically, when audio data that has been downloaded on the portable telephone terminal is reproduced, a real time accounting is made possible by transmitting data indicating the reproduction of audio data to the center of the radio telephone company through the telephone network line. In this manner, when the portable telephone terminal incorporates the audio reproducing apparatus, the audio data distribution service becomes possible under the condition that a copyright concerning the reproduction of music can be protected reliably.

On the other hand, since it is customary that the telephone company sells the portable telephone terminal incorporating the audio reproducing apparatus to the contractors of the telephone network line, even when a user who is a contractor of the telephone network line has canceled the contract of the radio telephone network line, the portable telephone terminal itself still remains for the user. If the portable telephone terminal the contract of which has been canceled is used as the audio reproducing apparatus, then a user become able to freely listen to downloaded audio data reproduced from the audio reproducing apparatus out of control of the telephone company, which is undesirable from a copyright protection standpoint.

There are places and situations in which a use of the portable telephone terminals should preferably be prohibited. In such places and situation, users are usually requested to switch off the portable telephone terminal and a use of the terminal should be prohibited. In hospitals, for example, in order to protect medical equipment from malfunctioning due to radio waves from the portable telephone terminals, it is recommended that users should switch off the portable telephone terminals. This applies for the portable telephone terminal incorporating the audio reproducing apparatus as well so that users are requested to switch off the portable telephone terminals in the hospital. However, at the same time the power-switch of the portable telephone terminal is turned off, the audio reproducing function assembled into the portable telephone terminal also is de-energized so that a user cannot listen to a piece of music reproduced by the audio reproducing function incorporated in the portable telephone terminal through the headphone attached to the portable telephone terminal in the waiting room of the hospital, for example.

While the problem encountered with the portable telephone terminal incorporating the audio reproducing apparatus has been described so far, there arises a similar problem when a similar communication terminal incorporates other functions which are not directly related to radio communications.

SUMMARY OF THE INVENTION

In view of the aforesaid aspect, it is an object of the present invention to properly limit operations of other functions when a communication terminal apparatus incorporates other functions.

It is another object of the present invention to select the operating situations of respective functions when a communication terminal apparatus incorporates functions other than the communication function.

According to an aspect of the present invention, when a predetermined base station and a communication terminal communicate with each other by radio waves, a communication at the communication terminal is permitted if a predetermined registration processing is made. Further, a predetermined function other than a communication function of the communication terminal is limited if the above registration processing is not made. With the above arrangement, only when the communication terminal is correctly registered for communication, the predetermined function of the communication terminal becomes available.

According to another aspect of the present invention, in the radio communication terminal which communicates with a predetermined base station by radio waves, when a predetermined operation mode is set by the operating means, at least the transmission processing at the radio communication means is stopped and the execution of predetermined functions other than the radio communication processing is not restricted.

With the above arrangement, when the predetermined operation mode is set, only the processing concerning the radio communication function is stopped and other predetermined functions can be executed.

BRIEF DESCRIPTION OF THE DRAWINGS

FIG. 5 is a flowchart to which reference will be made in explaining one of operations executed when the terminal apparatus is operated;

FIG. 6 is an explanatory diagram showing an example of a message displayed when the terminal apparatus is operated as shown in FIG. 5;

FIG. 9 is a flowchart to which reference will be made in explaining a further example of operations executed when the terminal apparatus is operated according to an embodiment of the present invention;

FIG. 10 is an explanatory diagram showing an example of a message displayed when the terminal apparatus is operated as shown in FIG. 9;

DESCRIPTION OF THE PREFERRED EMBODIMENT

The present invention will be described below with reference to the accompanying drawings.

In this embodiment, the present invention is applied to a radio telephone apparatus (portable telephone terminal) which can make a telephone call or a data communication by transmitting digital data of various systems between it and a base station via radio waves, for example. The portable telephone terminal according to this embodiment incorporates an audio reproducing function section in addition to a radio telephone function section.

Figure 1:
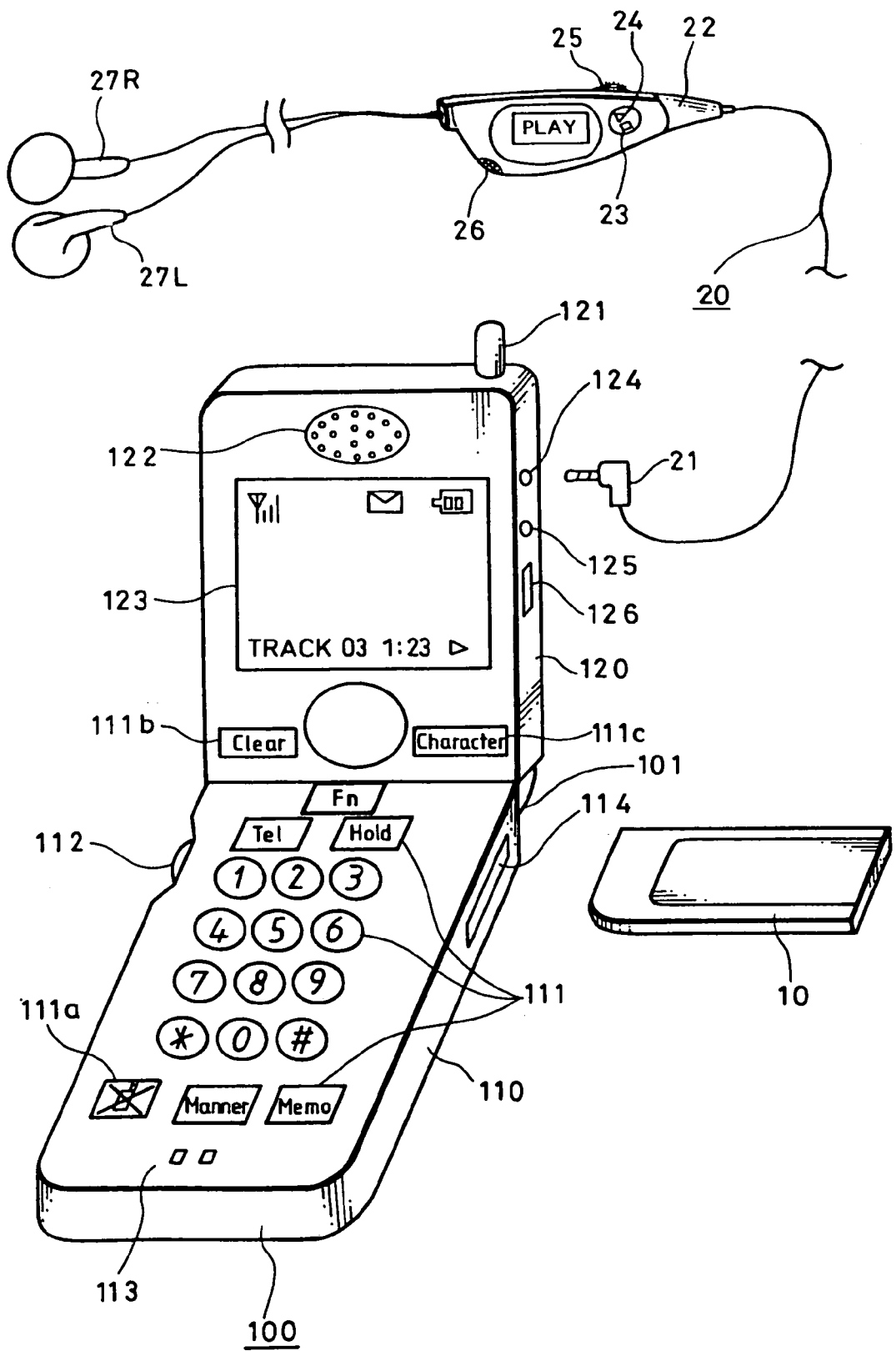
FIG. 1 is a perspective view showing a terminal apparatus according to an embodiment of the present invention while the terminal apparatus is being opened.

FIG. 1 is a perspective view showing an example of an outward appearance of a portable telephone terminal 100 according to an embodiment of the present invention. As shown in FIG. 1, the portable telephone terminal 100 according to this embodiment is a portable telephone terminal of a so-called flip type in which a first housing 110 and a second housing 120 can be rotatably joined by a joint portion 101. FIG. 1 shows the portable telephone terminal 100 with its respective housings 110, 120 being opened. The first housing 110 has on its inside face a keypad portion 111 comprised of a plurality of keys when the portable telephone terminal 100 is opened for use as a cellular phone. Keys prepared on the keypad portion 111 are numeral keys such as 0 to 9, symbol keys such as #, keys for making a telephone call and keys for setting various functions. Of the above function keys, a key 111a is used to set and cancel a mode in which the telephone function is stopped and only an audio reproducing function, which will be described later on, is operated. In the following description, the mode in which the telephone function is stopped and only the audio reproducing function is operated will be referred to as a "telephone function stop mode", and the key 111a will be referred to as a "telephone function stop mode setting key". Details of the telephone function stop mode will be described later on.

Keys 111b, 111c are disposed on the second housing 120. The first housing 110 has on its side wall a jog dial (registered trademark) portion 112 which can be rotated and depressed by a user. Various operations are made possible when a user operates the jog dial portion 112. A user can operate the audio reproducing function by operating the jog dial portion 112.

The first housing 110 has on its lower end a microphone 113 to enable users to make a telephone call. The second housing 120 has on its upper end a speaker 122 for making a telephone conversation. A user becomes able to make a telephone call by putting the microphone 113 and the speaker 122 close to the mouth and the ear. The second housing 120 has at its center a display panel comprising a display portion 123. The display portion 123 is able to display the state in which the portable telephone terminal 100 is being operated and a variety of data concerning the telephone such as registered telephone numbers and received character mails in the form of numerals, characters, graphics and the like. The display portion 123 can also display messages concerning an audio reproduction function which will be described later on.

The first housing 110 is provided with a memory card loading slot 114. A memory card 10 in which predetermined data can be stored/read can be inserted from the side wall of the first housing 110 into the memory card loading slot 114, for example. The memory card 10 that can be used in this embodiment might be a memory card in which a nonvolatile semiconductor memory is housed within a stick-like (rectangular thin plate-like) resin package.

The second housing 120 has a whip antenna 121 attached to its upper end and also has various terminals located at its side wall. Specifically, a headphone jack 124, an audio input jack 125, and a data communication port 126 are located on the side wall of the second housing 120. The headphone jack 124 is integrally comprised of an output section for outputting an audio signal (including a sound signal) supplied to a headphone device, an input section for inputting an audio signal picked up by a microphone incorporated within the headphone device and an input and output section for communicating with a remote control device attached to the headphone device. The data communication port 126 is used to connect the portable telephone terminal 100 to a suitable device such as a personal computer. Specifically, the data communication port 126 might be a standard interface port called a USB (Universal Serial Bus) or an IEEE (The Institute of Electrical and Electronics Engineers) 1394 standard interface port.

A headphone device 20 includes a plug 21 which is connected to the headphone jack 124, and a remote control portion 22 is attached to somewhere of a signal line of the headphone device 20. The remote control portion 22 has a display portion 23, a key 24, a volume 25 and a microphone 26 attached thereto. Left and right headphone units 27L, 27R are attached to the tip end portion of the signal line extended from the body of the headphone device 20.

Figure 2:
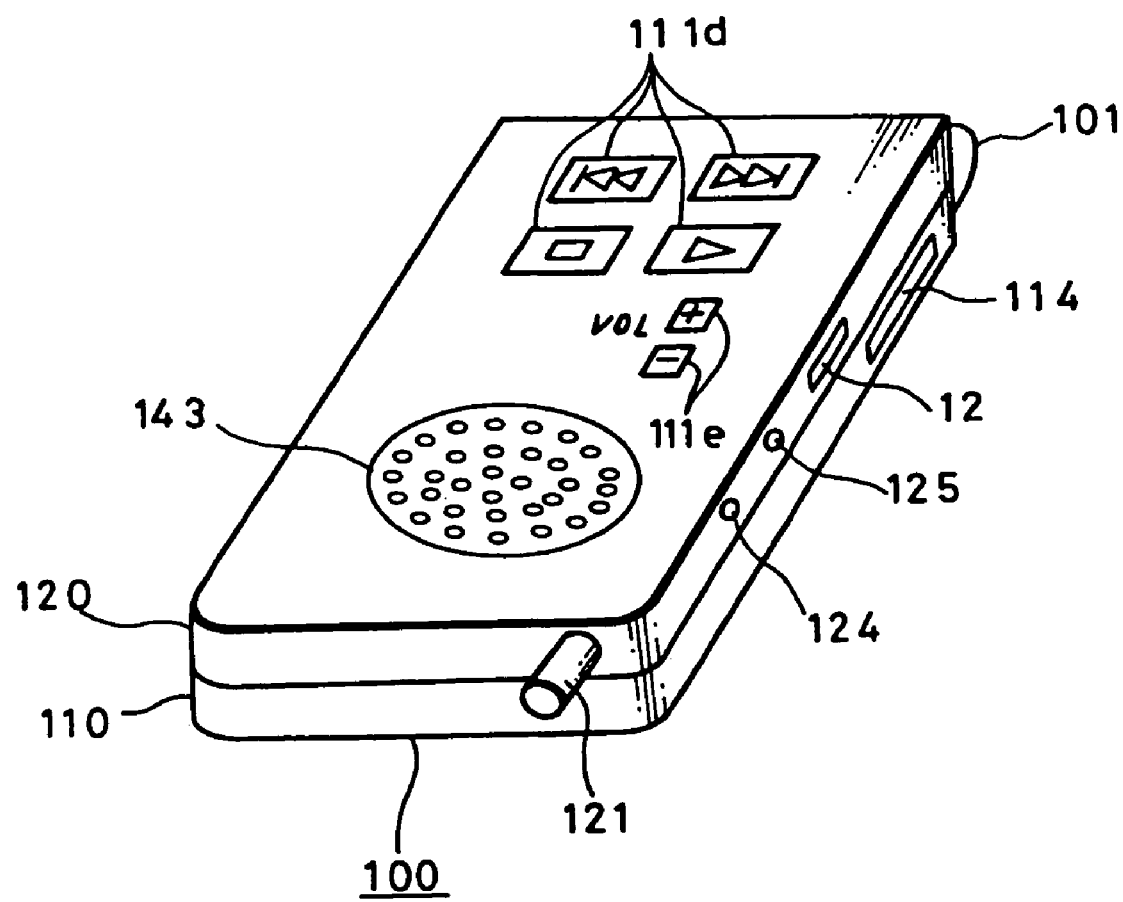
FIG. 2 is a perspective view showing the surface of the terminal apparatus shown in FIG. 1 while the terminal apparatus is being closed.

FIG. 2 is a perspective view showing the front (i.e., surface of the second housing 120) of the portable telephone terminal 100 of this embodiment while the portable telephone terminal 100 is being closed. On this surface, there are disposed a plurality of keys 111d for operating the portable telephone terminal 100 to reproduce audio data and volume keys 111e for adjusting a sound volume of reproduced sounds. Further, there is disposed a speaker 143 for emanating reproduced audio data or sounds. The speaker 143 is also used to emanate ring tones when an incoming call arrives at the portable telephone terminal 100.

Figure 3:
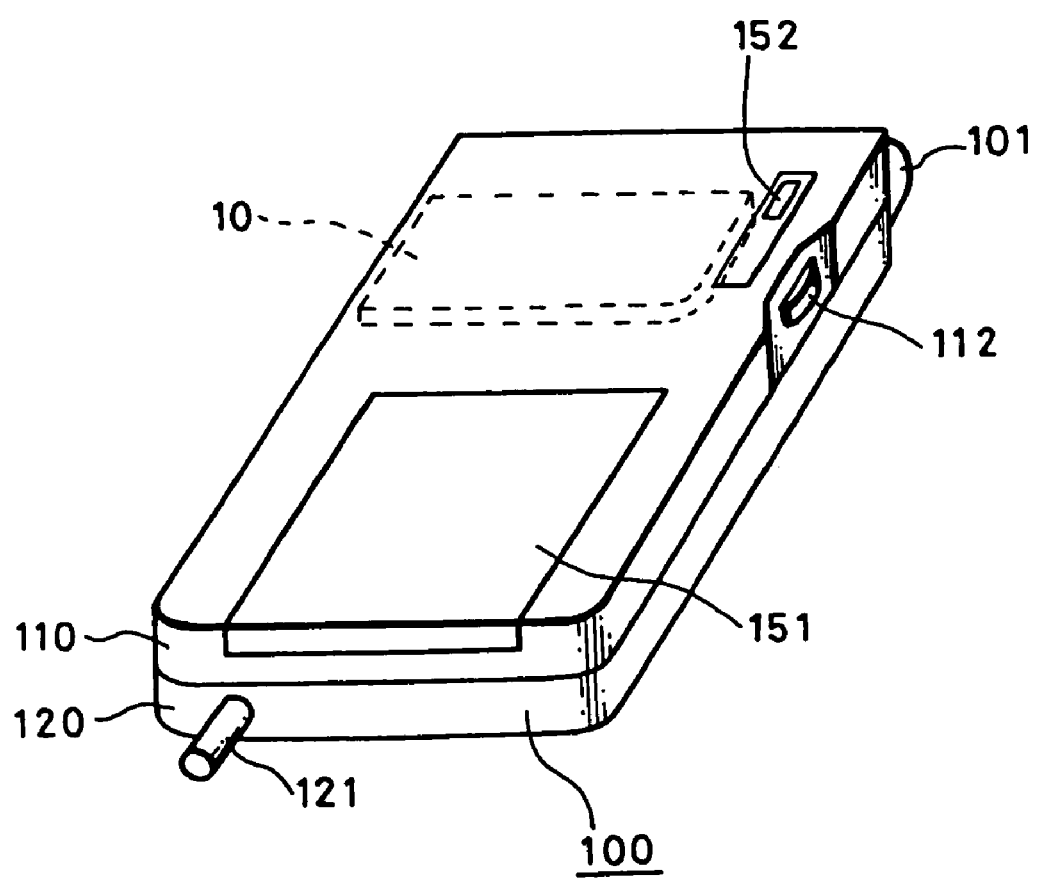
FIG. 3 is a perspective view showing the back of the terminal apparatus shown in FIG. 1 while the terminal apparatus is being closed.

FIG. 3 is a perspective view showing the back (i.e., surface of the first housing 110) of the portable telephone terminal 100 of this embodiment while the portable telephone terminal 100 is being closed. On this surface, there are disposed a battery loading portion 151 and an eject switch 152 for removing the memory card 10 from the memory card loading slot 114 (FIG. 1).

Next, the internal arrangement of the portable telephone terminal 100 according to this embodiment will be described with reference to FIG. 4.

Figure 4:
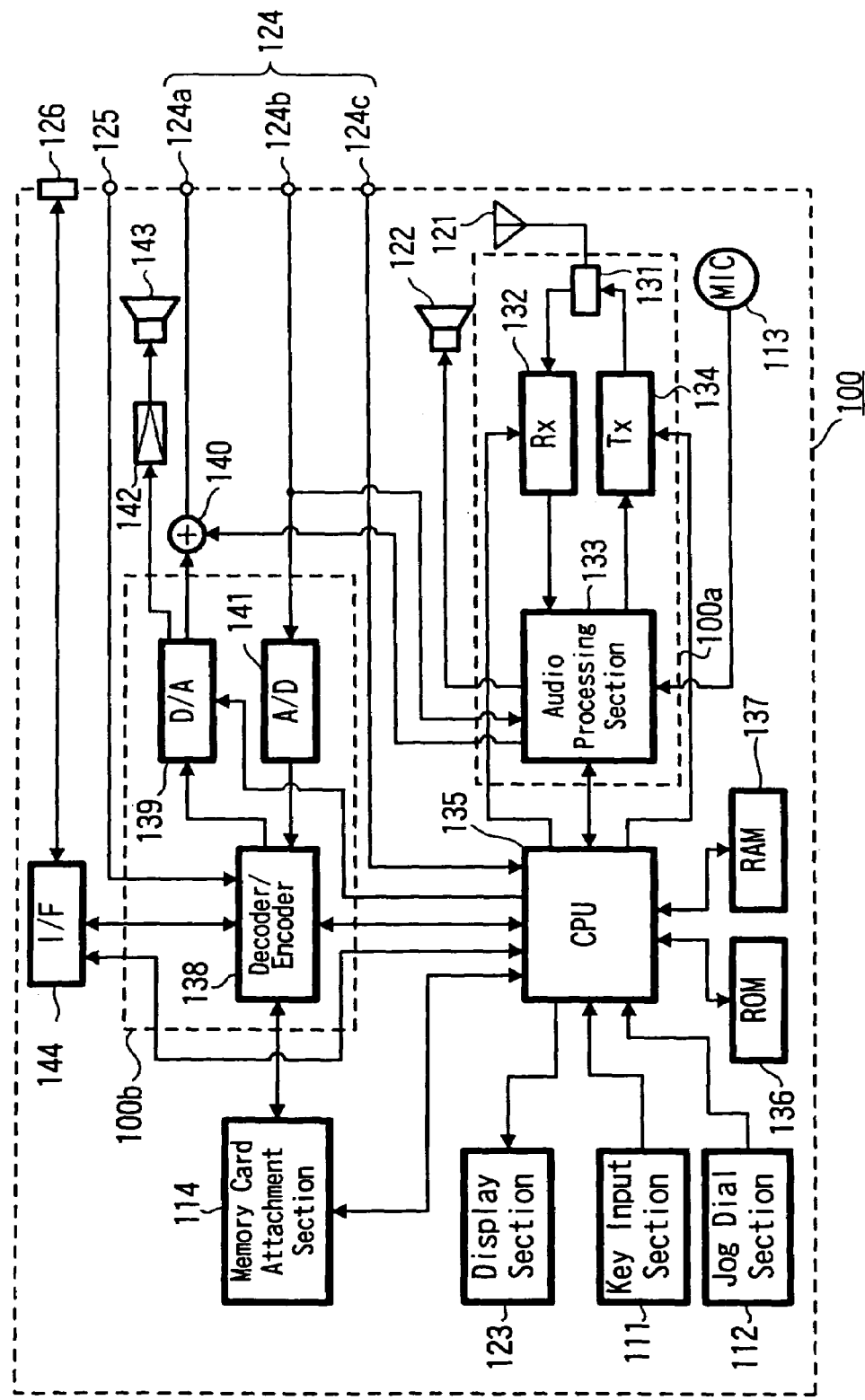
FIG. 4 is a block diagram showing the internal arrangement of the terminal apparatus according to an embodiment of the present invention.

As shown in FIG. 4, as circuits for use in the radio telephone, an antenna 121 is connected through an antenna sharing unit 131 to a receiving circuit 132 and a transmitting circuit 134. The receiving circuit 132 receives data of an instructed channel and supplies a received signal to an audio processing section 133. The audio processing section 133 demodulates the received signal to provide an audio signal and various data transmitted via radio waves. Further, the audio signal is outputted from the speaker 122. The audio processing section 133 receives an audio signal from the microphone 113 and processes the received audio signal in a suitable manner such as modulating the audio signal so that the modulated audio signal can be transmitted via radio waves. The transmitting circuit 134 processes the signal thus processed to provide a transmission signal of a predetermined channel and supplies the transmission signal to the antenna 121. The transmission signal is transmitted from the antenna 121 through radio waves.

The audio processing section 133, the receiving circuit 132 and the transmitting circuit 134 are operated to execute the processing under control of a CPU (central processing unit) 135. The CPU 135 is a microprocessor by which the processing of various kinds of signals within this portable telephone terminal 100 can be controlled. The audio reproduction function also can be controlled by the CPU 135.

The CPU 135 is connected with a ROM (read-only memory) 136 in which information required by the portable telephone terminal 100 to operate is stored and a RAM (random-access memory) 137 in which information such as phone book information registered by a user is stored so that the CPU 135 can read out information from the ROM 136 and the RAM 137 at any time. The ROM 136 might be a flash memory in which a part of stored data can be rewritten by a predetermined processing and in which registration information concerning the telephone function can be written. Registration information concerning the telephone function stored in the ROM 136 might be ID (identification) data which is an identification number inherent in this telephone terminal 100, information indicative of the existence of the contract to the radio telephone company, information of telephone number assigned to a user from the telephone company when a user has contracted with the telephone company, etc. If a contract concerning the audio reproduction function is required, then information of the contract concerning the audio reproduction function may be stored in the ROM 136.

Information obtained when a user operates the keypad portion 111 and the jog dial portion 112 is supplied to the CPU 135, and the CPU 135 enables the keypad portion 111 and the jog dial portion 112 to be operated based on the operation information. Display operation on the display portion 123 also can be controlled by the CPU 135.

The arrangement that has been described so far is fundamentally the arrangement concerning the telephone function of the portable telephone terminal 100. The antenna sharing unit 131, the receiving circuit 132, the audio processing section 133 and the transmitting circuit 133 shown in FIG. 4 will be referred to as a "telephone processing section 100a".

Next, an arrangement concerning the audio reproduction function of the portable telephone terminal 100 will be described below.

In this embodiment, data which results from compressing audio data by a predetermined system (e.g., ATRAC3 (Adaptive Transform Acoustic Coding 3) system) can be stored in the memory card 10. When the memory card 10 in which this audio data is stored is inserted into the memory card loading slot 114, data stored in the memory card 10 is supplied to a decoder 138 under control of the CPU 135. The decoder 138 expands the compressed data to provide original data and supplies the resultant original data to a D/A (digital-to-analog) converter 139. The D/A converter 139 converts the data supplied from the decoder 138 to provide an analog audio signal and supplies the analog audio signal thus converted to an output terminal 124a. This output terminal 124a is the terminal disposed in the inside of the headphone jack 124 shown in FIG. 1.

The output from the D/A converter 139 and the telephone conversation audio output from the audio processing section 133 are added by an adder 140 and an added signal is developed at the output terminal 124a. Thus, when a user operates the portable telephone terminal 100 in order to make a telephone conversation, the user can listen to sounds of a telephone conversation reproduced from the headphone device 20. Then, the audio signal is supplied to the headphone device 20 connected to the output terminal 124a and thereby outputted. The analog audio signal outputted from the D/A converter 139 may be processed in such an analog signal processing fashion as to be amplified, if necessary.

The analog audio signal outputted from the D/A converter 139 can be supplied through an amplifier 142 to the speaker 143 attached to the surface of the portable telephone terminal 100 and thereby outputted from the speaker 143. The output system of the D/A converter 139 is selected under control of the CPU 135.

The audio reproduction function section according to this embodiment includes also a recording function to record (store) an inputted audio signal (including a sound signal) on the memory card 10 inserted into the memory card loading slot 114. For this recording function, the portable telephone terminal 100 includes a digital audio data input terminal 125. Audio data applied to the input terminal 125 is supplied to the decoder 138. The decoder 138 according to this embodiment can also function as an encoder for encoding inputted data so that the inputted data can be recorded. Under control of the CPU 135, data encoded by the encoder 138 is stored in the memory card 10 inserted into to the memory card loading slot 114. The decoding and the encoding at the decoder 138 are based on the system suitable for processing audio data such as music data.

The headphone jack 124 shown in FIG. 1 includes an input terminal 124b to which an audio signal is inputted from a microphone incorporated within the headphone 20 and a remote control input and output terminal 124c in addition to the output terminal 124a shown in FIG. 4. An audio signal applied to the input terminal 124b may be supplied through an A/D (analog-to-digital) converter 141 to the decoder 138, in which it may be encoded similarly to the audio data and stored in the memory card 10. An audio signal applied to the input terminal 124b from the microphone may be supplied to the audio processing section 133, in which it can be processed as telephone conversation sounds similarly to the sounds inputted from the microphone 113. The remote control input and output terminal 124c is the terminal by which the CPU 135 can communicate with the remote control portion 22 within the headphone device 20. The CPU 135 controls a display on the display portion 23 within the remote control portion 22 and judges operation information obtained when the key 24 is operated. If a remote control signal is superimposed upon the audio signal (sound signal), then the remote control input and output terminal 124c can be formed as a terminal common to the output terminal 124a. The decoder (encoder) 138, the D/A converter 139 and the A/D converter 141 shown in FIG. 4 will be referred to as a "recording and reproducing section 100b".

The portable telephone terminal 100 according to this embodiment includes a data communication port 126 to communicate with an information device such as a personal computer. An I/F (interface) section 144 is connected to the data communication port 126 so that the CPU 135 and the decoder 138 can communicate with devices of the party being called connected to the data communication port 126 through the I/F section 144. When the portable telephone terminal 100 communicates with an external device through this data communication port 126, audio data supplied to the data communication port 126 from the external device, for example, may be supplied to the decoder 138, in which it may be compressed for recording (storage) and the resultant compressed data may be stored in the memory card 10 inserted into the memory card loading slot 114 or audio data stored in the memory card 10 may be expanded by the decoder 138 and the resultant expanded data may be supplied to the device connected to the data communication port 126. Further, in this communication, data that the portable telephone terminal 100 has received via the radio telephone network line may be supplied to the data communication port 126 under control of the CPU 135 and thereby supplied to the external device. Conversely, data supplied to the data communication port 126 from the external device may be transmitted to the radio telephone network line under control of the CPU 135.

Furthermore, various data such as audio data received by the receiving circuit 132 of this portable telephone terminal 100 through the radio telephone network line may be stored in the memory card 10 under control of the CPU 135. In this case, if the received data is data that was already encoded for storage, then the received data need not be encoded by the encoder 138 and may be written in the memory of the memory card 10.

As described above, the portable telephone terminal according to this embodiment incorporates the function section capable of recording (storing) and reproducing audio data and sound data. In this embodiment, since the memory card 10 is detachable from the memory card loading slot 114, the memory card 10 in which audio data is stored from other audio device, for example, may be loaded onto the portable telephone terminal 100 and thereby reproduced.

In accordance with this embodiment, the operation of the reproducing function section incorporated within this portable telephone terminal 100 is limited in relation to the operation of the telephone terminal. The manner in which the operation of the reproducing function section is limited will be described below.

FIG. 5 is a flowchart to which reference will be made in explaining the manner in which the operation of the reproducing function section is limited.

Referring to FIG. 5, and following the start of operation, it is determined at a decision step S11 whether or not a user has operated the remote control portion 22 attached to the headphone device 20 or the keypad portion 111 attached to the portable telephone terminal 100 to energize the reproducing function section to reproduce or record audio data or sound data. If the user has executed the corresponding operation as represented by a YES at the decision step S11, then control goes to the next decision step S12, whereat it is determined whether or not information concerning a telephone registration is stored in the ROM 136 connected to the CPU 135. In this decision step S12, it is determined whether or not telephone number information allocated to this portable terminal apparatus 100, for example, is stored in the ROM 136. Alternatively, if information concerning the existence of the telephone registration is directly stored in the ROM 136, then it is determined based on the information concerning the existence of the telephone registration whether or not telephone number information allocated to this portable terminal apparatus 100 is stored in the ROM 136.

If information concerning the existence of the telephone registration is not stored in the ROM 136 as represented by a NO at the decision step S12, then control goes to a step S13, whereat a message indicating that the audio reproducing (recording) function is invalid is displayed on the display portion 123 of the portable telephone terminal 100 or the display portion 23 of the remote control section 22, for example, and the CPU 135 limits the reproduction (recording) processing of data stored in the memory card 10. At that very moment, the display portion 123 may display a message "AUDIO FUNCTION IS NOT AVAILABLE" as shown in FIG. 6, for example.

If the portable telephone terminal is a portable telephone terminal in which information concerning the telephone registration is stored in the memory 136 as represented by a YES at the decision step S12, then control goes to the next decision step S14, whereat it is determined whether or not the amount of remaining energy obtainable from a secondary battery (not shown) incorporated within the portable telephone terminal 100 is greater than the amount of remaining energy capable of reproducing or recording audio data. In this embodiment, it is assumed that audio data can be reproduced or recorded when the amount of remaining energy obtainable from the secondary battery is greater than 30%. If the amount of remaining energy obtainable from the secondary battery is less than 30%, then such amount of remaining energy obtainable from the secondary battery is assumed to be enough to make an outgoing call or to receive an incoming call so that the reproducing function section of the portable telephone terminal is inhibited from being energized. If the amount of remaining energy obtainable from the secondary battery is less than the amount of remaining energy obtainable from the secondary battery to reproduce or record audio data as represented by a NO at the decision step S14, then control goes to a step S15, whereat the display portion 123 of the portable telephone terminal 100, for example, may display a message indicating that audio data cannot be reproduced (recorded) in shortage of the amount of remaining energy obtainable from the secondary battery. Then, the CPU 135 limits the reproduction (recording) of data stored in the memory card 10.

If on the other hand the amount of remaining energy obtainable from the secondary battery is sufficient as represented by a YES at the decision step S14, then control goes to a step S16, whereat the reproduction operation or the recording operation based on the operation judged at the step S11 is started.

In this manner, when the operation of the reproducing recording) function section incorporated within the portable telephone terminal 100 is limited, if this portable telephone terminal 100 is a terminal apparatus that a user has not made a contract with the telephone company or the like, then such terminal apparatus can be inhibited from being used as a reproducing apparatus or a recording apparatus. Hence, the telephone company which manages the portable telephone terminals can properly manage the function incorporated within the portable telephone terminal 100.

Figure 7:
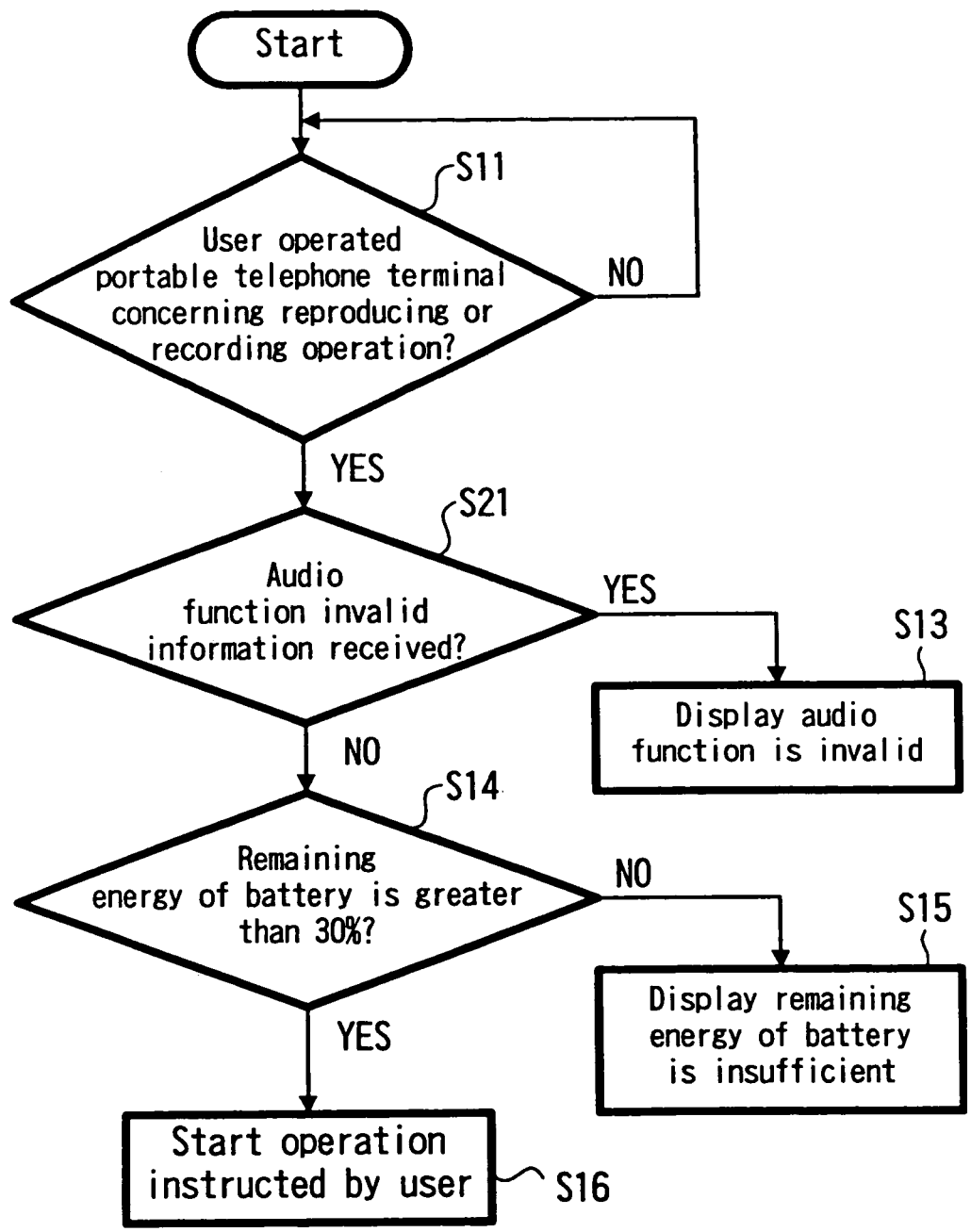
FIG. 7 is a flowchart to which reference will be made in explaining other example of operations executed when the terminal apparatus is operated according to an embodiment of the present invention.

While the function is limited based on the existence of the registration information stored in the memory (ROM) 136 of the portable telephone terminal 100 in the example shown in FIG. 5, the present invention is not limited thereto and the function may be limited based on information received by the portable telephone terminal 100 through a radio telephone network line (radio telephone network line includes a network line through which controlling data or the like is transmitted and received). FIG. 7 is a flowchart to which reference will be made in explaining the manner in which the function is limited based on information received by the portable telephone terminal 100 through the telephone network line. As shown in FIG. 7, the decision step S12 in the flowchart of FIG. 5 is replaced with a decision step S21, at which it is determined whether or not information which makes the audio function become invalid is received. Other steps in the flowchart of FIG. 7 are the same as those of the flowchart of FIG. 5 and therefore need not be described.

With respect to the information which makes the audio function become invalid received at the step S21, when a position registration request signal is transmitted to the base station side of the radio telephone system in order to register the position of the portable telephone terminal 100, for example, if a reject signal for rejecting the position registration is received as an answer to the position registration request signal, then such reject signal may be judged as the information which makes the audio function become invalid.

Figure 8:
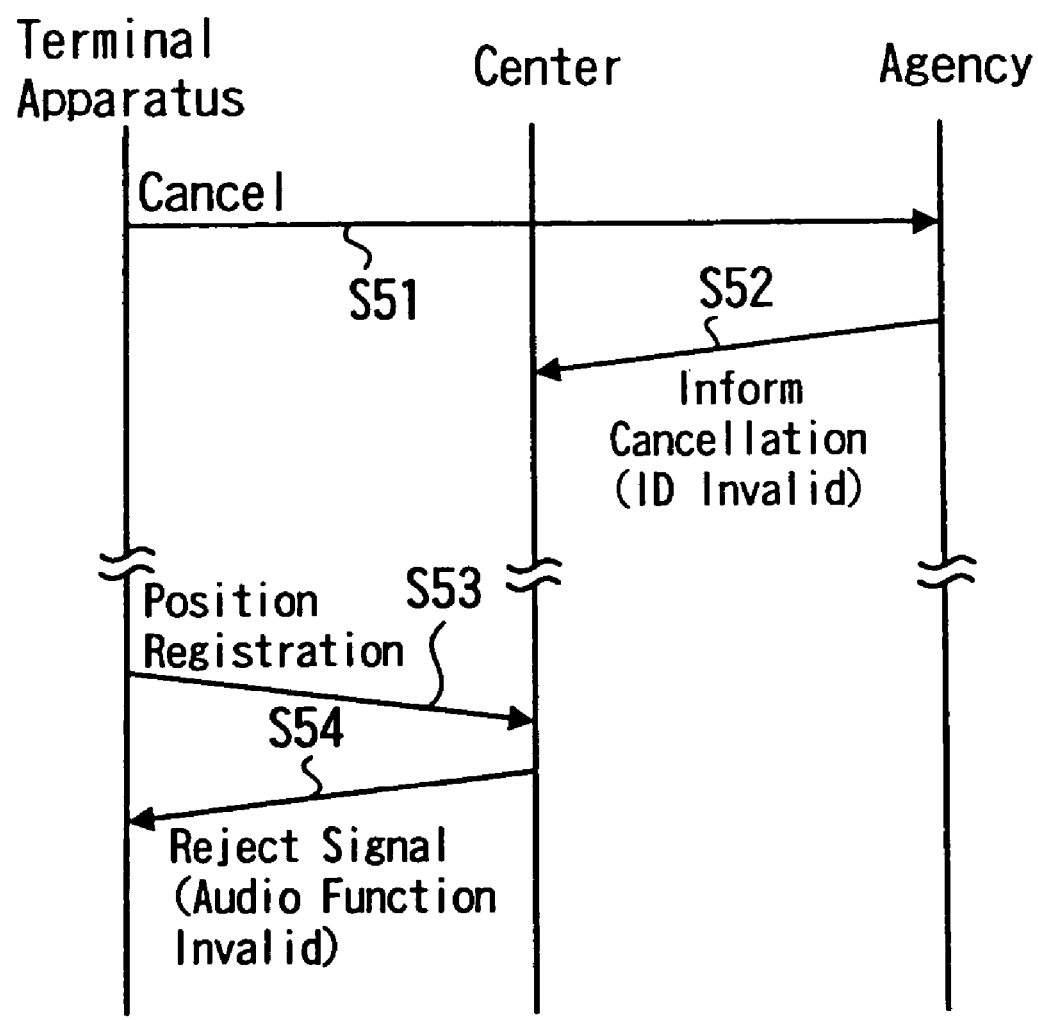
FIG. 8 is a timing chart to which reference will be made in explaining the manner in which a reject signal is received in the flowchart of FIG. 7.

FIG. 8 shows the manner in which this reject signal is received. In FIG. 8, let it be assumed that a user brings the portable telephone terminal 100 that has been so far contracted with the radio telephone company, for example, to an agency of the telephone company and cancels the contract of the portable telephone terminal at a step S51. At that very moment, contract information (telephone number information) that had been stored in the portable telephone terminal 100 need not be erased. At a step S52, the agency that has canceled this contract lets the management center of the telephone company know that the contract of the portable telephone terminal 100 of the corresponding ID number has been canceled. After the management center of the telephone company has got this notice, if the position registration request signal is transmitted from the portable telephone terminal 100 of the same ID number at a step S53, then it is judged by the management center that the portable telephone terminal of that ID number is not the portable telephone terminal which is contracted with the telephone company. Then, at a step S54, the management center transmits the reject signal for rejecting the position registration to the portable telephone terminal, and the portable telephone terminal which has received this reject signal is made unable to make an outgoing call or to receive an incoming call as a radio telephone terminal.

The transmission of the position registration request signal at the step S53 is executed as an initial operation executed when the power switch of the portable telephone terminal 100, for example, is turned on. While the portable telephone terminal is being operated after the power switch thereof had been turned on, when the current position of the portable telephone terminal is changed and base station ID which will be received by the portable telephone terminal 100 is changed accordingly, the position registration request signal may be transmitted from the portable telephone terminal. While the user has proposed to cancel the contract of the portable telephone terminal in the example of FIG. 8, if it is determined by the telephone company that the user has used the portable telephone terminal illegally (or the user has not paid telephone charges), then the management center handles the portable telephone terminal 100 of the corresponding ID number as a canceled portable telephone terminal and limits the function of such canceled portable telephone terminal.

In this manner, when the operation of the reproducing (recording) function section incorporated within the portable telephone terminal is limited based on data that has been received at the terminal via radio waves, information and the like stored in the flash memory within this portable telephone terminal 100 need not be rewritten and the functions incorporated within the portable telephone terminal 100 can properly be managed by only the processing at the telephone company side which manages the portable telephone terminals.

While it has been positively determined based on the stored data and the received data by the portable telephone terminal 100 that the contract of the portable telephone terminal was canceled as described above, the present invention is not limited thereto and the functions of the portable telephone terminal may be limited based on only the state in which the portable telephone terminal is in use. FIG. 9 is a flowchart to which reference will be made in explaining the manner in which the function of the portable telephone terminal is limited based on the state in which the portable telephone terminal is in use.

As shown in FIG. 9, the decision step S12 in the flowchart of FIG. 5 is replaced with a decision step S31, whereat it is determined whether or not a time period in which the portable telephone terminal used as the radio telephone makes an outgoing call or receives an incoming call lasts longer than a predetermined time period (30 days or longer). If a user has not used the portable telephone terminal as the telephone to make an outgoing call or to receive an incoming call more than 30 days as represented by a YES at the decision step S31, then control goes to the step S13. Other steps in the flowchart of FIG. 9 are the same as those of FIG. 5 and therefore need not be described.

An example of a message displayed at the step S13 in the case of this flowchart of FIG. 9 may be a message "AUDIO FUNCTION IS LOCKED. LOCK IS CANCELED WHEN MAKING AN OUTGOING CALL" as shown in FIG. 10, letting a user know that the limit of the audio function is canceled when the user operates the portable telephone terminal as the telephone.

In this manner, when the operation of the reproducing (recording) function section within the portable telephone terminal is limited based on only the state in which the portable telephone terminal itself is in use, it becomes possible to properly manage the function incorporated into the portable telephone terminal 100. Specifically, in the above example, the audio reproducing function section incorporated into this portable telephone terminal becomes unavailable after 30 days passed since the contract of the portable telephone terminal as the telephone terminal had been canceled. Hence, the reproducing function section can be prevented from being used unlimitedly by the portable telephone terminal which has no contract with the telephone company.

Next, a telephone function stop mode incorporated within the radio telephone terminal 100 according to this embodiment will be described. Since the radio telephone apparatus (terminal) according to this embodiment incorporates the audio reproducing function section comprising the recording and reproducing section 100b and its peripheral circuits as already described, when a user operates the telephone function stop mode setting key 111a (see FIG. 1), it is possible to stop only the radio telephone function which is the radio communication function. The setting of the mode for partly stopping the function is realized under control of the CPU 135 which controls operations of the respective sections within the radio telephone terminal, for example.

Figure 11:
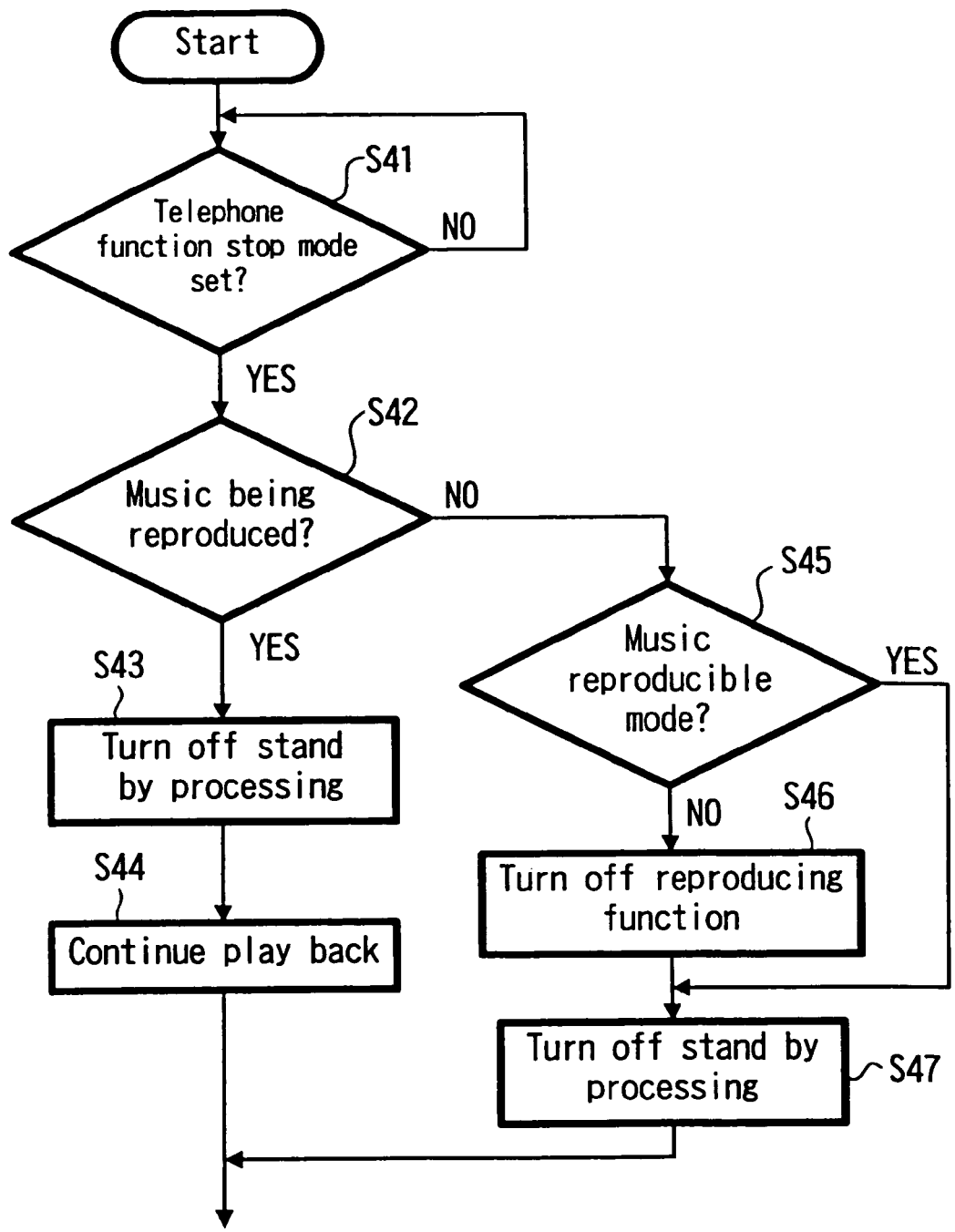
FIG. 11 is a flowchart to which reference will be made in explaining the manner in which the terminal apparatus is operated when the terminal apparatus is placed in the telephone function stop mode according to an embodiment of the present invention.

A flowchart of FIG. 11 shows an example of operations executed when the telephone function stop mode is set under control of the CPU 135. Referring to FIG. 11, and following the start of operation, if it is determined at a decision step S41 by the CPU 135 that a user sets the corresponding mode by operating the telephone function stop mode setting key 111a, then control goes to the next decision step S42, whereat it is determined whether or not the current operating situation is such one in which music (or sound) data stored in the memory card 10 is being reproduced by using the recording and reproducing section 100b. If the current operating situation is the reproducing operation as represented by a YES at the decision step S42, then control goes to a step S43, whereat a radio telephone standby processing at the telephone processing section 100a is turned off, and the portable telephone terminal is controlled so as not to communicate with the base station through radio waves. Then, control goes to a step S44, whereat the reproduction of a piece of music is continued.

If the current operating situation is not the music (sound) data reproducing operation as represented by a NO at the decision step S42, then control goes to a decision step S45, whereat it is determined whether or not the telephone function stop mode presented at that very moment is the mode in which music data can be reproduced. If the telephone function stop mode is previously set by user's registration operation as a mode for stopping the music reproducing function as represented by a NO at the decision step S45, then control goes to a step S46, whereat the music reproducing function using the recording and reproducing section 100b also is turned off under control of the CPU 135. If on the other hand the mode is the mode which can reproduce music data as represented by a YES at the decision step S45, then after the processing at the step S46 was finished, the radio telephone standby processing at the telephone processing section 100a is turned off (step S47), and the portable telephone terminal is controlled so as not to communicate with the base station via radio waves.

If the telephone function stop mode setting key 111a is operated under the situation in which this telephone function stop mode is set, then the function section that had been turned off when such mode is set is turned on. For example, under the situation in which the telephone function stop mode is set, if the power switch of the whole of the portable telephone terminal 100 is turned off by operating the power-supply key of this radio telephone terminal 100, then when the power switch of the potable telephone terminal 100 is again turned on by the following operation of the power-supply key, the telephone function stop mode is canceled. Alternatively, when the power switch of the portable telephone terminal 100 is again turned on, the telephone function setting mode may be set. These mode setting situations presented when the portable telephone terminal is powered again may be registered by previously selecting any one of these processing according to the user setting, for example.

Figure 12:
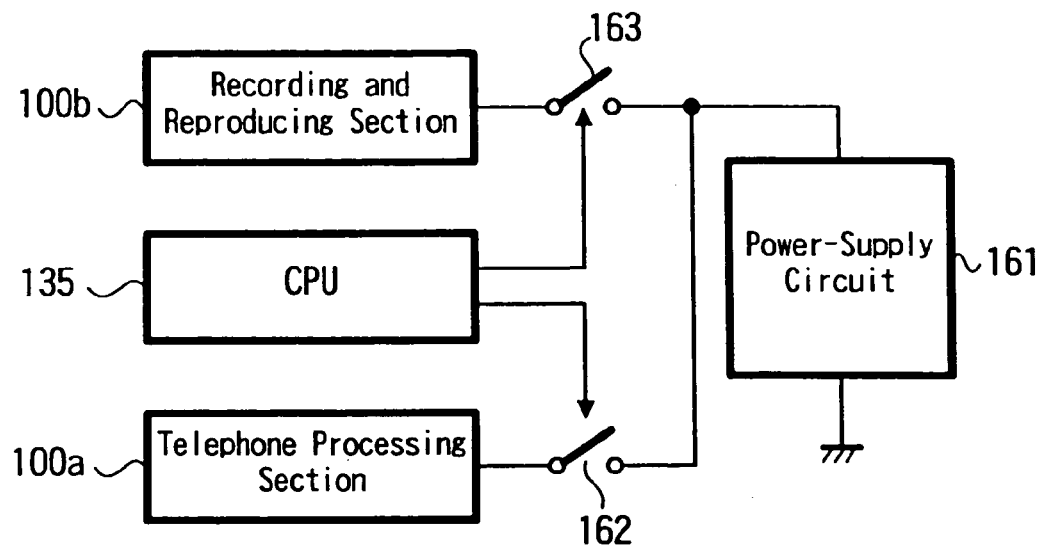
FIG. 12 is a block diagram showing an example of a power-supply arrangement which can realize the telephone function stop mode according to an embodiment of the present invention.

FIG. 12 is a schematic block diagram showing an example of an arrangement in which the on-off control of the telephone function at the telephone processing section 100*a* and the on-off control of the recording and reproducing section 100*b* shown in the flowchart of FIG. 11 are realized under control of the CPU 135. In this example, operations of the respective sections are executed and stopped by controlling the supply of the power-source voltage to the respective sections 100*a*, 100*b* from the power-supply circuit 161. Specifically, a power-supply switch 162 is connected to a path through which a power is supplied to the telephone processing section 100*a* from the power-supply circuit 161. A power-supply switch 163 is connected to a path through which a power is supplied to the recording and reproducing section 100*b* from the power-supply circuit 161. The on-off of the two power-supply switches 162, 163 is controlled based on the mode setting situation under control of the CPU 135. The power-supply circuit 161 is adapted to convert a voltage outputted from a battery housed within the portable telephone terminal 100 into a voltage which is used to energize the respective circuits within the portable telephone terminal 100. With the above arrangement, modes can be set satisfactorily under control of the CPU 135. When the telephone function stop mode is set, this portable telephone terminal 100 cannot await an incoming call and cannot make an outgoing call.

Figure 13:
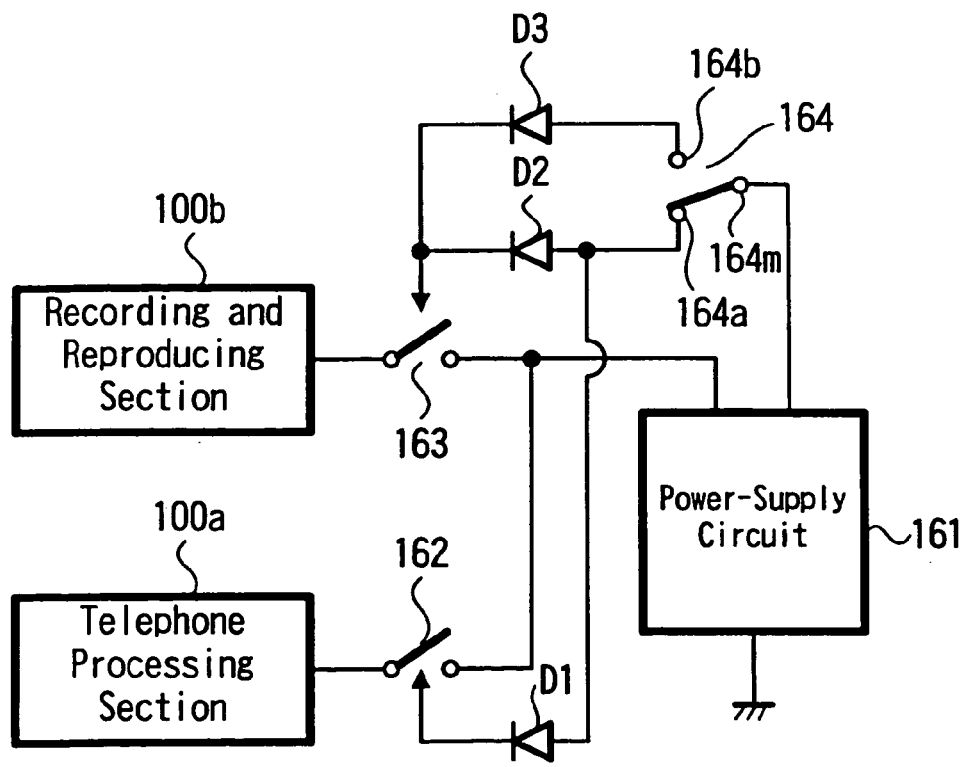
FIG. 13 is a block diagram showing other example of a power-supply arrangement which can realize the telephone function stop mode according to an embodiment of the present invention.

FIG. 13 is a block diagram showing an example of an arrangement required when modes are set without the CPU 135. In this example, there is provided a mode change-over switch 164 which is continuously changed in position in response to the depressions of the telephone function stop mode setting key 111*a*, for example. A relationship between this switch 164 and the key 111*a* is such one that, each time a user depresses the key 111*a*, for example, this switch 164 connects its movable contact 164*m* to one fixed contact 164*a* or the other fixed contact 164*b* repeatedly.

In this example, a voltage supplied from the power-supply circuit 161 to the movable contact 164*m* of the mode change-over switch 164 is selectively supplied to control terminals of the power-supply switches 162 and 163 as an operation voltage each time the switch 164 is changed in position. Specifically, when the movable contact 164*m* of the mode change-over switch 164, for example, is connected to one fixed contact 164*a*, the power-supply circuit 161 supplies a voltage signal which energizes the switch 162 through a diode D1 to the telephone processing section 100*a* and supplies a voltage signal which energizes the switch 163 through a diode D2 to the recording and reproducing section 100*b*. Accordingly, in this state, the voltage is supplied to both of the telephone processing section 100*a* and the recording and reproducing section 100*b* so that the two processing sections 100*a*, 100*b* are energized. Then, while the mode change-over switch 164 is connecting the movable contact 164*m* to the other fixed contact 164*b*, the power-supply circuit 161 supplies a voltage signal which energizes only the switch 163 through a diode D3 to the recording and reproducing section 100*b*. Accordingly, in this state, the voltage is supplied to only the recording and reproducing section 100*b* and the telephone processing section 100*a* is not energized.

As described above, with the arrangement in which the switch is changed-over, there may be set the mode in which the voltage is supplied to energize only the recording and reproducing section 100*b*.

While all operations of the circuits comprising the telephone processing section 100*a* are stopped when the telephone function stop mode is set as described above, the present invention is not limited thereto, and only operation of a part of the circuits may be stopped. Specifically, since the telephone function stop mode is fundamentally used in the situation in which the radio telephone terminal 100 is not able to transmit radio waves, only the circuit which operates to output radio waves may be stopped.

Figure 14:
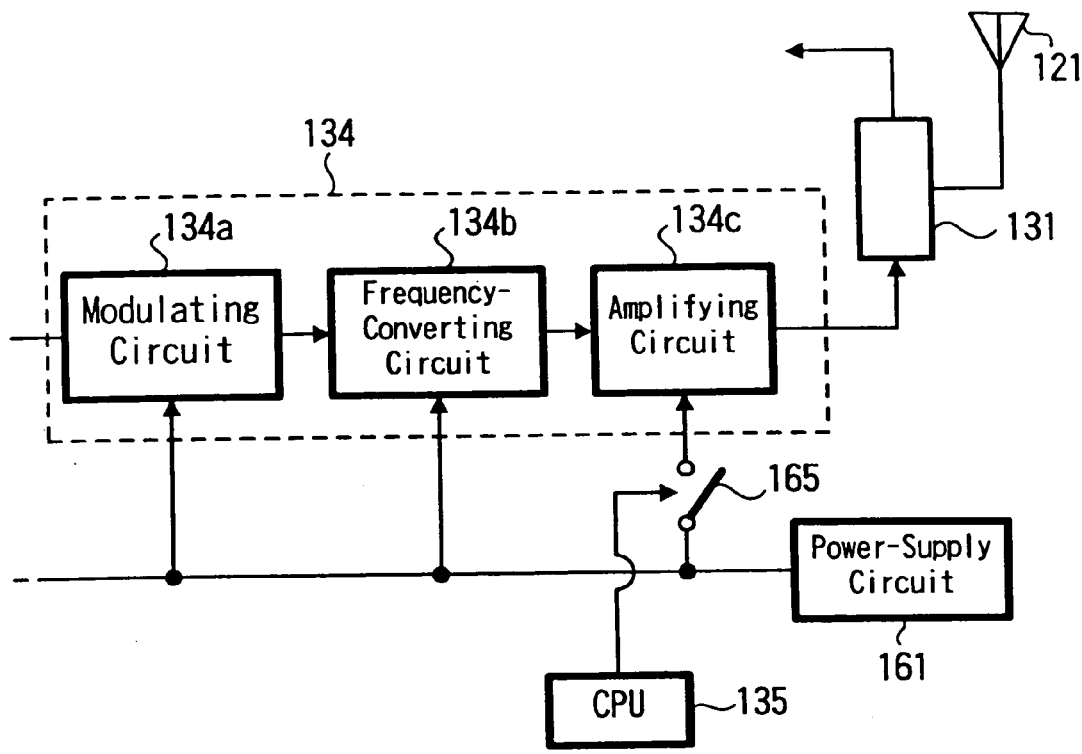
FIG. 14 is a block diagram showing a further example of a power-supply arrangement which can realize the telephone function stop mode according to an embodiment of the present invention.

FIG. 14 is a schematic block diagram showing an example of an arrangement required when only operation of a part of circuits is stopped. In this example, the transmitting circuit 134 is adapted to be energized by the voltage supplied from the power-supply circuit 161. Specifically, as shown in FIG. 14, the transmitting circuit 134 comprises a modulating circuit 134*a* for modulating transmission data, a frequency-converting circuit 134*b* for frequency-converting the thus modulated transmission signal to provide a transmission channel signal and an amplifying circuit 134*c* for amplifying the transmission signal frequency-converted by the frequency-converting circuit 134*b* up to the transmission output. The amplifying circuit 134*c* is connected to the antenna sharing unit 131, and the output from the amplifying circuit 134*c* is supplied through the antenna sharing unit 131 to the antenna 121. Further, a power-supply switch 165 which can be energized and de-energized under control of the. CPU 135 is connected to a line through which a voltage is supplied to the amplifying circuit 134*c* within the transmitting circuit 134. With this arrangement, when the telephone function stop mode is set, only the supply of the voltage to the amplifying circuit 134*c* is stopped and other circuits 134*a*, 134*b* within the transmitting circuit 134 are still being energized by the voltage. Although not shown in FIG. 14, the receiving circuit 132 and the audio processing section 133 (see FIG. 1) also are still being energized by the voltage.

With the above arrangement, when the telephone function stop mode is set, the supply of the transmission signal from the amplifying circuit 134*c* through the antenna sharing unit 131 to the antenna 121 is interrupted so that this portable telephone terminal does not radiate radio waves. Then, since other circuits for executing the transmission processing and the reception processing are being energized by the voltage, when the telephone function stop mode, for example, is canceled, the portable telephone terminal may be placed immediately in the situation under which it can make an outgoing call and receive an incoming call. In this case, since the receiving circuit 132 and the audio reproducing circuit 133 shown in FIG. 1 are being energized, then only the processing for receiving a signal transmitted from the base station, for example, becomes possible. Accordingly, in the case of this example, even in the situation under which the telephone function stop mode is set, it can be determined whether or not the current position of this portable telephone terminal 100 lies within a communication area. Moreover, the service area can be displayed based on the judged result.

While only the supply of the voltage to the amplifying circuit 134*c* provided at the final stage within the transmitting circuit 134 is controlled in the example of FIG. 14, the present invention is not limited thereto, and the supply of the voltage to amplifying circuits (not shown) in other circuits within the transmitting circuit 134 may be controlled in a similar manner.

When the telephone function stop mode is set, only the supply of the voltage to all of the circuits within the transmitting circuit 134 may be stopped and the voltage may be supplied to the receiving circuit 132 and the audio processing section 133. Even with this arrangement, only the receiving function can be energized similarly to the case shown in FIG. 14.

While the receiving circuit 132 is energized and the high-frequency processing is executed within the receiving circuit 132 so that a high-frequency signal of a small amount is leaked to the outside of the portable telephone terminal, if the leakage of the high-frequency signal becomes serious, then when the telephone function stop mode is set, the reception processing may be stopped by interrupting the supply of the voltage to the receiving circuit 132.

While the audio data is recorded on the inserted memory card and the recorded audio data is reproduced as described above, the present invention is not limited thereto, and the portable telephone terminal may be operated as an audio recording and reproducing apparatus in which audio data recorded through the microphone housed within the portable telephone terminal or audio data of a telephone call obtained when the portable telephone terminal is used as the telephone may be stored in the memory within the memory card and the recorded audio data may be reproduced, if necessary. In this case, while the processing for data to be stored may be the same as the encode processing (compression processing) and the decode processing (inverse-compression processing) required when audio data such as music data is stored in the memory, the present invention is not limited thereto, and an encode processing and a decode processing with a higher data compression ratio suitable for audio data of a telephone conversation may be executed.

While all of the audio recording and reproducing functions incorporated within the portable telephone terminal are limited in the above embodiment, the present invention is not limited thereto, and a part of the recording and reproducing functions may be limited based on some suitable conditions such as a contract with a telephone. For example, only the reproduction of audio data downloaded onto the portable telephone terminal 100 from a predetermined center through the radio telephone network line and stored in the memory within the memory card 10 may be limited based on the contract made by the portable telephone terminal as the telephone and the reproduction of audio data stored in the memory card 10 by other device may not be limited by the existence of the contract for the telephone. In this case, when audio data downloaded through the telephone network line is stored in the memory card 10, information indicative of such downloaded audio data may be added to audio data and the resultant data may be stored in the memory card 10.

While the memory card is used as the available recording medium (storage medium) as described above, the present invention is not limited thereto, and other recording medium can be used. When the memory is used as the storage medium, a storage means in which the above memory is previously incorporated within the terminal apparatus may be used and inhibited from being changed.

While the audio data and sound data reproducing function and recording (storage) function are incorporated into the telephone terminal apparatus as described above, when other function is incorporated into the telephone terminal apparatus, the incorporated function may be controlled similarly. For example, when other data such as image data and game program are stored in the memory instead of the audio data and its reproduction function is incorporated into the terminal apparatus, the image reproduction function and the game executing function may be limited in a similar manner.

Figure 15:
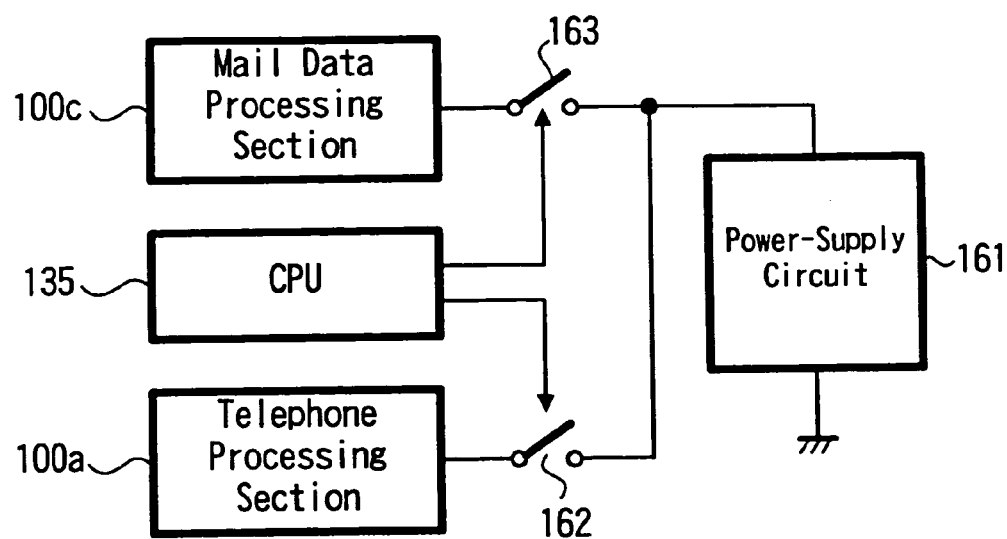
FIG. 15 is a block diagram showing an example in which a processing according to an embodiment of the present invention is applied to a terminal apparatus having a different arrangement.

For example, if the telephone terminal apparatus is provided with the telephone function stop mode, then when the telephone function stop mode is set, the telephone function section may be stopped by energizing the function section other than the recording and reproducing function section incorporated into the terminal apparatus. For example, as shown in FIG. 15, the radio communication terminal incorporates a mail data processing section 100c in addition to the telephone processing section 100a. The mail data processing section 100c can display and edit mail data of received characters and images and can input characters and images which are to be transmitted as mail data. A power-supply switch 162 is connected to a path through which a voltage is supplied from the power-supply circuit 161 to the telephone processing section 100a and a power-supply switch 163 is connected to a path through which a voltage is supplied from the power-supply circuit 161 to the mail data processing section 100c. Then, the two switches 162, 163 may be controlled by the CPU 135 in response to the setting situation of the telephone function stop mode similarly to the case of the example of FIG. 12. With the above arrangement, in the state in which the radio telephone function of this radio communication terminal is stopped, the display portion becomes able to display and input character mail.

Further, the radio communication terminal may incorporate a browsing function section for the browser of the Internet. Then, when the telephone function stop mode is set, only data received at and accumulated in the browsing function section can be displayed. In this case, while the telephone function stop mode is being set, only data that has been accumulated before the telephone function stop mode is set can be displayed. When data received at the telephone function section is displayed in real time, the telephone function stop mode should be canceled.

While the operation of the telephone terminal apparatus is stopped by controlling the supply of the voltage to the circuit for stopping the operation of the telephone function section when the telephone function stop mode is set as described above, the operation of the telephone function section may be stopped by other method. For example, while the telephone terminal apparatus is being powered, the telephone function section may be restricted in a software fashion so as not to be operated under control of the CPU, or the like.

While the portable telephone terminal using the radio telephone network line is used as the communication terminal as described above, the present invention is not limited thereto, and in a communication system that can be used by only a specific terminal apparatus registered on the system side operating a communication network line, functions other than the communication function incorporated within each terminal apparatus may be controlled in a similar manner.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of controlling a communication terminal that communicates with a predetermined base station by radio waves, comprising the steps of:

enabling said radio communication to be executed when a registration processing concerning a predetermined communication is executed;

limiting a processing for executing a predetermined function other than said radio communication when said registration processing is not executed, wherein said registration processing is comprised of receiving and registering controlling data transmitted from said predetermined base station, and said registration processing further comprises registering data identifying said communication terminal on a communication management center connected to said predetermined base station, and data for limiting said predetermined function at said communication terminal is transmitted when identification data transmitted from said communication terminal is identification data that is not registered on said communication management center; and displaying a message to a user of the communication terminal that said predetermined function is invalid when said identification data is not registered.

* * * * *